United States Patent
Fu et al.

(10) Patent No.: US 9,788,362 B2
(45) Date of Patent: Oct. 10, 2017

(54) METHODS AND ARRANGEMENTS FOR IMPROVING TRANSMISSION CONTROL PROTOCOL PERFORMANCE IN A CELLULAR NETWORK

(75) Inventors: Jing Fu, Solna (SE); Åsa Bertze, Spånga (SE); Icaro Leonardo J. Da Silva, Sollentuna (SE); Fredrik Kuivinen, Johanneshov (SE); Yu Wang, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 44 days.

(21) Appl. No.: 14/356,195

(22) PCT Filed: Nov. 23, 2011

(86) PCT No.: PCT/SE2011/051408
§ 371 (c)(1),
(2), (4) Date: May 5, 2014

(87) PCT Pub. No.: WO2013/077786
PCT Pub. Date: May 30, 2013

(65) Prior Publication Data
US 2014/0286313 A1  Sep. 25, 2014

(51) Int. Cl.
*H04L 29/08* (2006.01)
*H04W 80/06* (2009.01)
(Continued)

(52) U.S. Cl.
CPC ........... *H04W 80/06* (2013.01); *H04L 69/163* (2013.01); *H04W 36/08* (2013.01)

(58) Field of Classification Search
None
See application file for complete search history.

(56) References Cited

U.S. PATENT DOCUMENTS

2002/0106991 A1* 8/2002 Foore .................... H04W 28/08
  455/70
2002/0167948 A1* 11/2002 Chen ....................... H04L 47/10
  370/392
(Continued)

FOREIGN PATENT DOCUMENTS

EP          2154857 A1    2/2010
GB          2372406 A     8/2002
(Continued)

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," Technical Specification 36.300, Version 9.4.0, 3GPP Organizational Partners, Jun. 2010, 171 pages.

(Continued)

*Primary Examiner* — Ayaz Sheikh
*Assistant Examiner* — Tarell Hampton
(74) *Attorney, Agent, or Firm* — Patents on Demand P.A.; Brian K. Buchheit; Scott M. Garrett

(57) ABSTRACT

A method in a network node for improving transmission control protocol, TCP, performance in a cellular network is provided. The network node handles TCP packet transferral between a user equipment and a server in the cellular network. The user equipment and the server are configured to adapt a retransmission timeout setting based on round trip times for performed TCP packet transferrals. When the network node obtains an indication of a handover outage being upcoming for the user equipment, the network node deliberately delays, in a time period preceding the indicated handover outage, a transferal of a TCP packet between the (Continued)

server and the user equipment to increase the round trip time for the TCP packet.

18 Claims, 10 Drawing Sheets

(51) Int. Cl.
*H04W 36/08* (2009.01)
*H04L 29/06* (2006.01)

(56) References Cited

U.S. PATENT DOCUMENTS

| | | | |
|---|---|---|---|
| 2003/0043844 A1* | 3/2003 | Heller | H04L 29/06 370/466 |
| 2005/0070246 A1* | 3/2005 | Qazi | H04L 1/188 455/347 |
| 2006/0092838 A1* | 5/2006 | Lee | H04L 47/283 370/229 |
| 2007/0086387 A1* | 4/2007 | Kang | H04B 7/2606 370/331 |
| 2007/0230337 A1* | 10/2007 | Igarashi | H04L 1/1848 370/230 |
| 2007/0254664 A1 | 11/2007 | Klotsche | |
| 2008/0165723 A1* | 7/2008 | Kim | H04L 47/10 370/318 |
| 2009/0149185 A1* | 6/2009 | Narasimha | H04W 68/02 455/442 |
| 2014/0050095 A1* | 2/2014 | Szilagyi | H04L 1/0002 370/236 |

FOREIGN PATENT DOCUMENTS

| | | |
|---|---|---|
| KR | 20100113853 A | 10/2010 |
| WO | 2004057817 A2 | 7/2004 |

OTHER PUBLICATIONS

Jacobson, V. et al., "TCP Extensions for High Performance," Request for Comments: 1323, Network Working Group, May 1992, 37 pages.
Paxson, V. et al., "Computing TCP's Retransmission Timer," Request for Comments: 2988, Standards Track, Network Working Group, The Internet Society, Nov. 2000, 8 pages.
Postel, Jon (editor), "Transmission Control Protocol: DARPA Internet Program Protocol Specification," Request for Comments 793, Information Sciences Institute, University of Southern California, Sep. 1981, Marina del Rey, California, 89 pages.
Psaras, Ioannis et al., "The TCP Minimum RTO Revisited," Proceedings of the 6th International IFIP-TC6 Conference, vol. 4479, Atlanta, Georgia, Springer Berlin Heidelberg, May 14-18, 2007, pp. 981-991.
International Search Report and Written Opinion for PCT/SE2011/051408 mailed Oct. 5, 2012, 9 pages.
Durst, R. C. et al., "TCP Extensions for Space Communications," ACM Wireless Networks, vol. 3, No. 5, Oct. 1997, pp. 389-403.
European Search Report for European Patent Application No. 11876384.6, mailed Feb. 20, 2015, 4 pages.

* cited by examiner

| PACKET NR | INCOMING TIME | OUTGOING TIME | PACKET RTT | SRTT ESTIMATION | RTO |
|---|---|---|---|---|---|
| 0 | 0 | 0 | 60 | 60 | 120 |
| 1 | 0 | 32 | 92 | 64 | 128 |
| 2 | 1 | 32 | 91 | 67,375 | 134,75 |
| 3 | 2 | 32 | 90 | 70,203125 | 140,4063 |
| 4 | 3 | 32 | 89 | 72,55273438 | 145,1055 |
| 5 | 4 | 32 | 88 | 74,48364258 | 148,9673 |
| 6 | 5 | 32 | 87 | 76,04818726 | 152,0964 |
| 7 | 6 | 32 | 86 | 77,29216385 | 154,5843 |
| 8 | 7 | 32 | 85 | 78,25564337 | 156,5113 |
| 9 | 8 | 32 | 84 | 78,97368795 | 157,9474 |
| 10 | 9 | 32 | 83 | 79,47697695 | 158,954 |
| 11 | 10 | 32 | 82 | 79,79235483 | 159,5847 |
| 12 | 11 | 32 | 81 | 79,94331048 | 159,8866 |
| 13 | 12 | 32 | 80 | 79,95039667 | 159,9008 |
| 14 | 13 | 32 | 79 | 79,83159709 | 159,6632 |
| 15 | 14 | 32 | 78 | 79,60264745 | 159,2053 |
| 16 | 15 | 32 | 77 | 79,27731652 | 158,5546 |
| 17 | 16 | 32 | 76 | 78,86765195 | 157,7353 |
| 18 | 17 | 32 | 75 | 78,38419546 | 156,7684 |
| 19 | 18 | 32 | 74 | 77,83617103 | 155,6723 |
| 20 | 19 | 32 | 73 | 77,23164965 | 154,4633 |
| 21 | 20 | 32 | 72 | 76,57769344 | 153,1554 |
| 22 | 21 | 32 | 71 | 75,88048176 | 151,761 |
| 23 | 22 | 32 | 70 | 75,14542154 | 150,2908 |
| 24 | 23 | 32 | 69 | 74,37724385 | 148,7545 |
| 25 | 24 | 32 | 68 | 73,58008837 | 147,1602 |
| 26 | 25 | 32 | 67 | 72,75757732 | 145,5152 |
| 27 | 26 | 32 | 66 | 71,91288016 | 143,8258 |
| 28 | 27 | 32 | 65 | 71,04877014 | 142,0975 |
| 29 | 28 | 32 | 64 | 70,16767387 | 140,3353 |
| 30 | 29 | 32 | 63 | 69,27171464 | 138,5434 |
| 31 | 30 | 32 | 62 | 68,36275031 | 136,7255 |
| 32 | 31 | 32 | 61 | 67,44240652 | 134,8848 |

FIG 5

| PACKET NR | INCOMING TIME | OUTGOING TIME | PACKET RTT | SRTT ESTIMATION | RTO |
|---|---|---|---|---|---|
| 0 | 0 | 0 | 60 | 60 | 120 |
| 1 | 0 | 42 | 102 | 65,25 | 130,5 |
| 2 | 1 | 46,675 | 105,675 | 70,303125 | 140,6063 |
| 3 | 2 | 51,2121875 | 109,2121875 | 75,16675781 | 150,3335 |
| 4 | 3 | 55,61673047 | 112,6167305 | 79,84800439 | 159,696 |
| 5 | 4 | 59,89360308 | 115,8936031 | 84,35370423 | 168,7074 |
| 6 | 5 | 64,04759296 | 119,047593 | 88,69044032 | 177,3809 |
| 7 | 6 | 68,08330822 | 122,0833082 | 92,86454881 | 185,7291 |
| 8 | 7 | 72,00518417 | 125,0051842 | 96,88212823 | 193,7643 |
| 9 | 8 | 75,81748976 | 127,8174898 | 100,7490484 | 201,4981 |
| 10 | 9 | 79,52433389 | 130,5243339 | 104,4709591 | 208,9419 |
| 11 | 10 | 83,12967137 | 133,1296714 | 108,0532981 | 216,1066 |
| 12 | 11 | 86,6373087 | 135,6373087 | 111,5012995 | 223,0026 |
| 13 | 12 | 90,05090962 | 138,0509096 | 114,8200007 | 229,64 |
| 14 | 13 | 93,37400051 | 140,3740005 | 118,0142507 | 236,0285 |
| 15 | 14 | 96,60997549 | 142,6099755 | 121,0887163 | 242,1774 |
| 16 | 15 | 99,76210141 | 144,7621014 | 124,0478894 | 248,0958 |
| 17 | 16 | 102,8335226 | 146,8335226 | 126,8960936 | 253,7922 |
| 18 | 17 | 105,8272655 | 148,8272655 | 129,6374901 | 259,275 |
| 19 | 18 | 108 | 150 | 132,1828038 | 264,3656 |
| 20 | 19 | 109 | 150 | 134,4099533 | 268,8199 |
| 21 | 20 | 110 | 150 | 136,3587092 | 272,7174 |
| 22 | 21 | 111 | 150 | 138,0638705 | 276,1277 |
| 23 | 22 | 112 | 150 | 139,5558867 | 279,1118 |
| 24 | 23 | 113 | 150 | 140,8614009 | 281,7228 |
| 25 | 24 | 114 | 150 | 142,0037258 | 284,0075 |
| 26 | 25 | 115 | 150 | 143,00326 | 286,0065 |
| 27 | 26 | 116 | 150 | 143,8778525 | 287,7557 |
| 28 | 27 | 117 | 150 | 144,643121 | 289,2862 |
| 29 | 28 | 118 | 150 | 145,3127308 | 290,6255 |
| 30 | 29 | 119 | 150 | 145,8986395 | 291,7973 |
| 31 | 30 | 120 | 150 | 146,4113096 | 292,8226 |
| 32 | 31 | 121 | 150 | 146,8598959 | 293,7198 |

METHODS AND ARRANGEMENTS FOR IMPROVING TRANSMISSION CONTROL PROTOCOL PERFORMANCE IN A CELLULAR NETWORK

This application is a 35 U.S.C. §371 national phase filing of International Application No. PCT/SE2011/051408, filed Nov. 23, 2011, the disclosure of which is incorporated herein by reference in its entirety.

TECHNICAL FIELD

Embodiments herein relate to a network node and a method in a network node. In particular, embodiments herein relate to improving transmission control protocol performance in a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, High Speed Packet Access (HSPA) and LTE have been and are currently developed.

The concept of a cellular system is that it has a large number of base stations covering a geographical area, providing mobility to the user equipments. Therefore, it is a requirement of the cellular network that, as a user equipment moves from one cell to another, it must be possible to hand an ongoing call or data session over from one base station to another with small disruptions. A handover is hence a change of serving cell for the user equipment, from a so called source cell to a so called target cell. There is a time period during the handover execution when neither the source cell nor the target cell can reach the user equipment. This will in the following be referred to as a handover outage.

Transmission Control Protocol (TCP) is a reliable, connection-oriented protocol used in the cellular network for transferring data in segments from a sender node to a destination node. Data and/or acknowledgement (ACK) of receipt of data are transferred in so called TCP packets, which comprises a header and a number of data bits.

The reliability of TCP is achieved by the sender node, such as a user equipment or a server, assigning a sequence number to each TCP packet it sends in a session to a destination node which may also be for example a user equipment or a server. The sequence number is indicated in the header of the TCP packet. When the sender node sends the TCP packet to the destination node, it starts a timer and waits for the destination node to acknowledge receipt of the TCP packet.

The time period from when the TCP packet is sent until its acknowledgment is received by the sender node is the TCP packets so called Round Trip Time, RTT.

If the acknowledgement is not received in the sender node within a pre-defined timer period, which is determined by the sender node based on RTTs for previously transferred TCP packets, a so called TCP timeout may occur in the sender node.

A TCP timeout may result in the sending node going into a so called slow start in which it retransmits the unacknowledged TCP packet, using the same sequence number, and waits for it to be acknowledged before a new TCP packet in the same session is transferred. The pre-defined timer period is called Retransmission Time Out (RTO).

A problem is that TCP sessions to or from a user equipment may be interrupted by TCP timeouts that occur in relation to handovers of the user equipment. This is because the handover outage may prevent TCP packets and/or acknowledgements from being transmitted to or from the user equipment in due time, which may hence result in the RTO being exceeded, and a TCP timeout to occur. This results in unsatisfactory performance and throughput for the TCP sessions.

SUMMARY

In view of the discussion above, it is an object for embodiments herein to provide improved TCP performance in a cellular network.

According to a first aspect, the object is achieved by a method in a network node for improving transmission control protocol, TCP, performance in a cellular network. The network node handles TCP packet transferral between a user equipment in the cellular network and a server. The user equipment and the server are configured to adapt a retransmission timeout setting based on round trip times for performed TCP packet transferrals. When the network node obtains an indication of a handover outage being upcoming for the user equipment, the network node deliberately delays, in a time period preceding the indicated handover outage, a transferral of a TCP packet between the server and the user equipment to increase the round trip time for the TCP packet.

According to a second aspect, the object is achieved by a network node for improving transmission control protocol, TCP, performance in a cellular network. The network node is adapted to handle TCP packet transferal between a user equipment in the cellular network and a server. The user equipment and the server are configured to adapt a retransmission timeout setting based on round trip times for performed TCP packet transferals. The network node comprises a delaying unit. The delaying unit is configured to, when obtaining an indication of a handover outage being upcoming for the user equipment, deliberately delay, in a time period preceding the indicated handover outage, a transferal of a TCP packet between the server and the user equipment to increase the round trip time for the TCP packet.

Thanks to the network node deliberately delaying the TCP packet in a time period preceding the handover outage, the round trip time for the TCP packet is increased. Since this increased round trip time will be used for adaption of the retransmission timeout, the retransmission timeout will be adapted to allow for the duration time of the handover outage. Thanks to this, TCP timeouts due to handover are reduced, slow stars are avoided, and performance such as throughput of TCP sessions is improved. This provides an improved TCP performance in the cellular network.

BRIEF DESCRIPTION OF THE DRAWINGS

FIG. 5 is a table illustrating features of some embodiments herein.

FIG. 6 is a table illustrating features of some embodiments herein.

DETAILED DESCRIPTION

Figure 1:
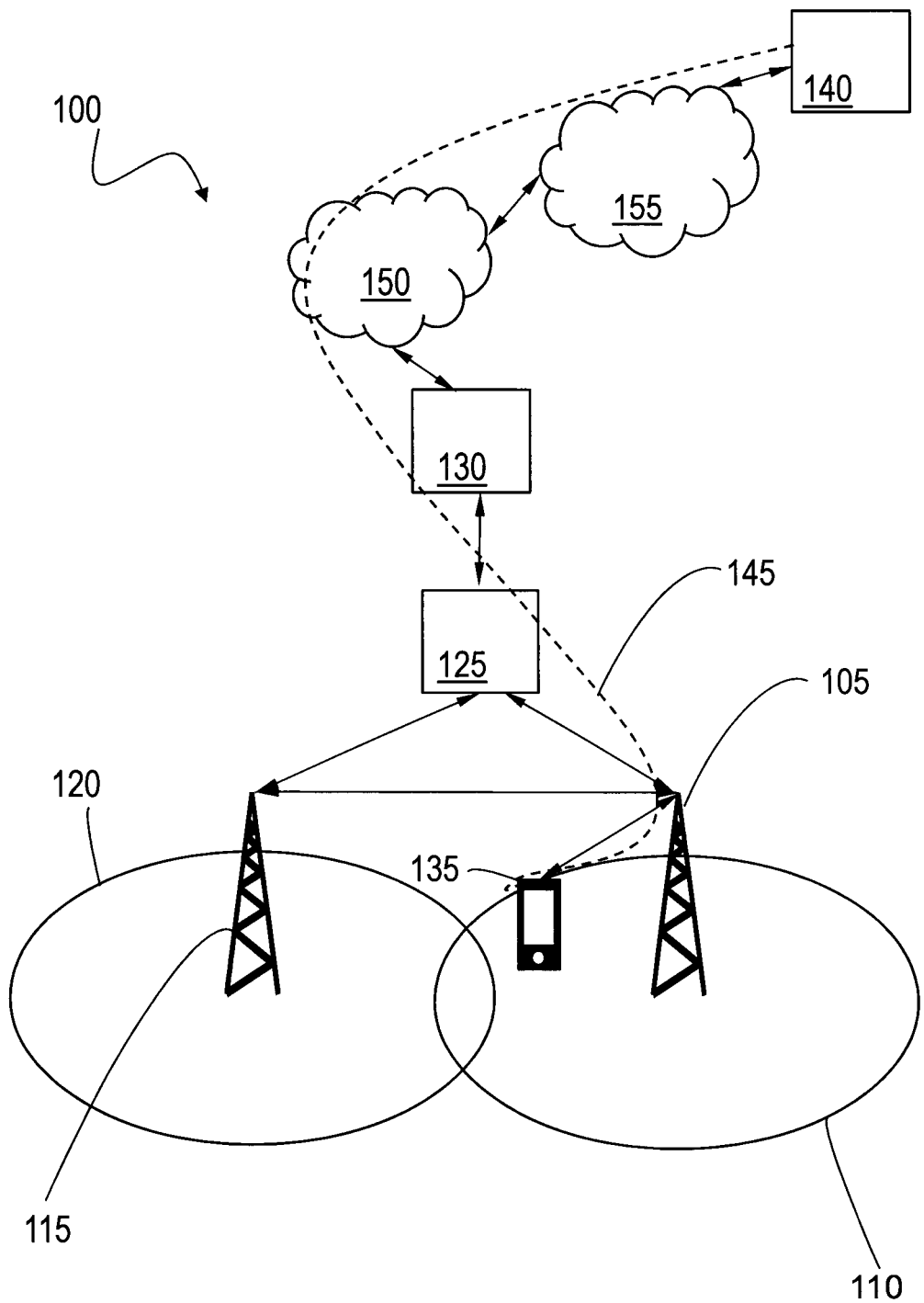
FIG. 1 is a schematic block diagram illustrating an embodiment of a cellular network.

FIG. 1 depicts a cellular network 100. The cellular network 100 is in this example an LTE cellular network, but may in other embodiments be a WCDMA cellular network, a GSM cellular network, any 3GPP cellular network, a combination thereof, or any other cellular network.

The cellular network 100 comprises a first base station 105 serving a first cell 110. The cellular network 100 further comprises a second base station 115 serving a second cell 120. The first base station 105 and the second base station 115 are in this example eNBs, but may in other embodiments be of another type and may in different embodiments be referred to by different names such as for example RBS, eNodeB, NodeB, B node, or BTS, depending on the technology and terminology used. The first base station 105 and the second base station 115 may in some embodiments be of different classes such as e.g. macro eNodeB, home eNodeB or pico base station.

The cellular network 100 further comprises a serving gateway 125 and a Packet data network (PDN) gateway 130.

A user equipment 135 is located in the first cell 110 and is served by the first base station 105. The user equipment 135 may be for example a communication device such as a mobile telephone, a cellular telephone, a dongle, a laptop, or tablet computer, sometimes referred to as a surf plate, with wireless capability. The user equipment may be portable, pocket-storable, hand-held, computer-comprised, or vehicle-mounted mobile devices, enabled to communicate voice and/or data, via the cellular network 100, with a server 140. The term server is here to be interpreted broadly, as an entity with which the user equipment 135 is enabled to communicate using Transmission Control Protocol (TCP). In some embodiments the server 140 may hence be another entity such as another in the FIG. 1 not shown user equipment. The communication, in the form of TCP packets, between the user equipment 135 and the server 140 traverses several nodes. This is illustrated by as by a TCP packet pathway 145, which traverses the first base station 105, the serving gateway 125, the PDN gateway 130, an operator PDN gateway 150 and the internet 155.

In this example, the interface between the first base station 105 and the second base station 110 is an X2 interface, the interface between the base stations 105, 110 and the serving gateway 125 is a S1U interface, the interface between the serving gateway 125 and the PDN gateway 130 is an S5 interface, and the interface between the PDN gateway 130 and the operator PDN 150 is an SGI. Note that when an X2 link is not operable, the first base station 105 and the second base station 115 may communicate over a not shown Mobility Management Entity (MME) through so called S1 links.

It is to be understood that in other embodiments, where the cellular network 100 is another type of cellular network than the above described, the TCP packet pathway 145 may traverse other nodes than the previously mentioned and the interface between these nodes may be different from the previously mentioned interfaces.

As part of the development towards embodiments herein, the terms RTT, RTO, and TCP timeout, as well as problems related thereto in relation to handover situations will first be identified and discussed below, with reference to FIG. 1.

The reliability of TCP may be achieved by assigning a sequence number to each TCP data packet, i.e. segment, in a TCP session. When a TCP packet comprising data is sent from the server 140 to the user equipment 135, or vice versa, a timer is started in the sender node, i.e. in the server 140 or in the user equipment 135 whichever sends the TCP packet. If an acknowledgement is not received from the destination node, i.e. from the other one of the user equipment 135 and the server 140, within a pre-defined timer period, the data is retransmitted from the sender node. The predefined timer period is called Retransmission Time Out (RTO). Note that, if data is transferred in both directions, a TCP packet comprising an acknowledgement may also comprise data. There may for this reason be a first field in the header of each TCP packet which is used for indicating the sequence number of the TCP packet itself, and a second field in the header which is used for acknowledgement of received TCP packets, i.e. for indicating the sequence number of received TCP packets.

The value of the RTO in the sender node relies on the previous statistics of a Round Trip Time (RTT). The Round Trip Time is the time, counted from the moment a TCP packet is transmitted until the moment the same TCP packet is acknowledged.

Note that by "round trip time" is understood the time it takes for the TCP packet comprising data to go from its sender to its destination, plus the time it takes for the TCP packet comprising the acknowledgement of receipt of the data to go from the destination to the sender. By "TCP packet" is hence within the context of this disclosure understood either a TCP packet comprising data or a TCP packet comprising the acknowledgement of the TCP packet comprising data.

TCP implementations attempt to predict a future RTT by averaging previous RTTs into a "Smoothed" RTT estimate (SRTT). When a TCP packet is sent over the TCP connection 145, the sending node 135 or 140 calculates how long it takes for it to be acknowledged, producing a sequence of round-trip time samples: $S(1), S(2), S(3), \ldots$, where $S(i)$ is the sample associated to the i-th segment. There are two ways to measure $S(1)$, $S(2)$, etc.

The first way is to measure the time from when a TCP packet is sent until it is acknowledged.

The second way is to embed a time stamp in each outgoing TCP packet containing data. The timestamp is then echoed back by the destination node when the data is acknowledged. This second method has some advantages on links with a large bandwidth delay product.

SRTT may be computed as $SRTT(i+1)=(1-\alpha)*SRTT(i)+\alpha*S(i)$, where $\alpha$ is a constant between 0 and 1 that controls how rapidly the SRTT adapts to congestion along the TCP pathway 145. A default value for $\alpha$ may be 0.125.

The RTO may be set based on this estimation, and be computed from the $SRTT(i)$ as $RTO(i)=\beta*SRTT(i)$, where $\beta$ is a constant greater then 1, chosen such that there is an acceptably small probability that the RTT for the i-th segment will exceed $RTO(i)$.

To avoid, or at least reduce, unnecessary retransmissions, the parameter $\beta$ may be set in such a way that the RTO represents an upper bound of the RTT. On the other hand, a too high RTO would add unnecessary delay and reduce the throughput in the case when a TCP packet is lost. A TCP specification recommends a value of $\beta=2$ as a reasonable balance. Another possibility is to vary $\beta$ based on an observed variance in measured RTTs.

There may also be a configurable parameter in the form of a minimum RTO, which specifies the minimum RTO for a TCP session. According to some specifications, the minimum RTO may not be smaller than 1 second, due to Operating System (OS) time granularity and network speed at that time. However, in a current Linux implementation, the default value for minimum RTO is 200 ms. Furthermore, it has been suggested by that this minimum RTO may not be needed at all.

TCP has a flow control procedure that reacts in two different ways. In case of congestion with TCP packets comprising data arriving out of order, the destination node will send a duplicate acknowledgement, and the sending node will reduce a window size to one-half of a current window size when three duplicate acknowledgements are received i.e., fast recovery of TCP.

In case the congestion occurs and no expected TCP packet arrives within the RTO, a TCP timeout occurs and the transmitter will set its window size to one segment, i.e., a so called slow start, leading to a significant impact on the TCP throughput.

Reducing the number of times a TCP session goes to slow start mode would hence improve the TCP performance in terms of throughput.

The concept of the cellular system 100 is that it has large number base stations of which two, the first base station 105 and the second base station 115 are shown in the FIG. 1, covering a geographical area. The cellular network 100 provides mobility to user equipments such as the in FIG. 1 shown user equipment 135, by performing a handover from the first cell 110, to the second cell 120, when the user equipment 135 moves from the first cell 110 to the second cell 120, so that the user equipment 135 becomes served by the second cell 120 instead of the first cell 130.

The handover may happen between cells within the same Radio Access Technology (RAT), e.g., when a connection is handed over from an LTE cell to another LTE cell. Also an inter-RAT handover may happen, e.g., from an LTE cell to a WCDMA cell.

The purpose of the Intra-LTE handover feature is to manage handovers of the user equipment 135 from one LTE cell to another. This ensures that the user equipment 135 is served by the best cell at all times. The handover is network controlled based upon user equipment 135 measurement reports of the serving first cell 105 and neighboring cells such as the second cell 120.

However, during the execution of the handover, the user equipment 135 will not be able to communicate neither with the first cell 105 or the second cell 110. This is because during the handover, there is a so called handover outage time when the user equipment cannot be reached from either of the two cells 110 and 120.

TCP packets arriving at the first base station 105 during the handover outage time need to be forwarded to the target, second base station 115, which will use the target, second cell 120 to send the TCP packets to user equipment 135 when the handover outage is over. The TCP packet forwarding may be implemented through the X2 interface.

The duration time of the handover outage may in average be about 90 ms, and some handovers may have a significantly larger handover outage time, for example above 200 ms.

Inter-RAT handovers between LTE and WCDMA in general have a longer outage time.

An RTT on the Internet varies depending on the location of the server in question. It may vary from less than one millisecond, if the server is close, to up to hundreds of milliseconds, if the server is far away. For example, an RTT across the Atlantic Ocean is about 100 ms.

In cellular networks, the end-to-end RTT also depends on the used radio access technology. Field measurements show, e.g., that the LTE RAN RTT is around 20 ms.

Hence, due to the relatively long handover outage times, RTO may occur because of TCP packets not being received within the expected RTT limit at the sender node.

Consider a scenario as that depicted in the FIG. 1, where the user equipment 135 tries to download a file using File Transfer Protocol (FTP) from the server 140. FTP is an application layer protocol that uses TCP. Assume that in this example, the average RTT from the user equipment 135 to the server 140 is 60 ms. Also, assume a TCP setting of β=2. Then, the RTO for the TCP session will be approximately 120 ms.

Consider now that the user equipment 135 is handed over from the first cell 110 to the second cell 120 during the download of the file. Assuming that the handover outage time is 90 ms, then, with the normal RTT of 60 ms, the total RTT for the TCP packets experiencing the handover will be about 150 ms.

Hence a problem is that, with an RTO of 120 ms, a TCP timeout will occur in this example, and TCP will enter slow-start phase with significantly reduced throughput.

Moreover, TCP packets arriving at the first base station 105 during and after the handover outage may need to be forwarded to the second base station 115 through the X2 interface, which requires system resources.

Some TCP end hosts, e.g. the user equipment 135 or the server 140, may have a configured minimum RTO of 200 ms. In such cases, a TCP timeout will not occur in the above scenario, as the RTO will be 200 ms instead of 120 ms.

However, if the RTT is 100 ms and the handover outage time is 120 ms, TCP timeout will still happen. Therefore, a minimum RTO of 200 ms will only protect from some of the TCP timeouts. Also, with a smaller configured minimum RTO, or with removal of minimum RTO, TCP timeouts will occur more frequently.

Therefore it is a problem that the handover outage, which prolongs the RTT of TCP packets during the handover, may cause unsatisfactory TCP performance due to numerous TCP timeouts.

Figure 2:
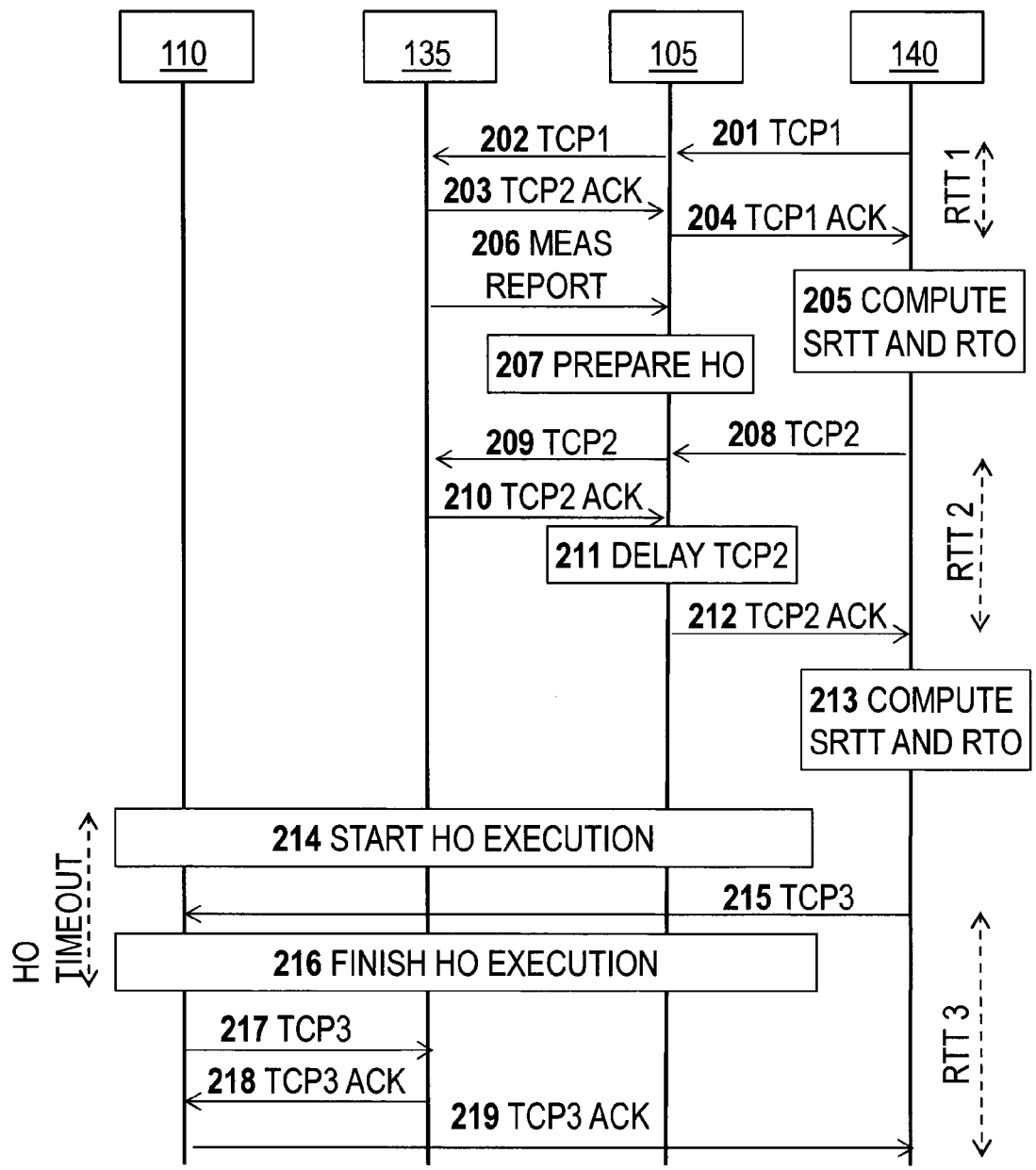
FIG. 2 is a combined signalling scheme and flowchart illustrating embodiments in a cellular network.

FIG. 2 illustrates how, according to some embodiments herein, TCP timeouts due to handover outage may be avoided by a method in a network node for improving TCP performance in the cellular network 100.

The network node in question carrying out the method is in this example the first base station 105. In other embodiments the network node may be any other suitable 20 network node forming part of the TCP pathway 145, such as or example the serving gateway 125 or the PDN gateway 130.

When discussing the FIG. 2, the numerals in FIG. 1 will also be referred to for the sake of clarity.

In action 201 a first TCP data packet, TCP 1, comprising data in a TCP session from the server 140 to the user equipment 135, leaves the server 140. The server 140 keeps track of the sending time of the first TCP data packet TCP1. This may, as previously mentioned, be done for example by starting a timer in the server 140 when the first TCP data packet TCP1 is sent, or by embedding a time stamp in the first TCP data packet TCP1. The first TCP data packet TCP1 is received by the first base station 105 which is on the pathway 145. Note that, as previously discussed in relation to the FIG. 1, the pathway 145 of the TCP packets may comprise other network nodes, which are omitted here.

In action 202 the first TCP data packet TCP1 traverses the first base station 105 and is sent by the first base station 105 over a radio interface in the first cell 110 to the user equipment 135. The user equipment 135 receives the first TCP data packet TCP1.

In action 203 the user equipment 135 sends an acknowledgement, TCP1 ACK, back to the server 140 upon receiving the TCP 1 in action 202. This is done to acknowledge receipt of the first TCP data packet TCP1. The TCP1 ACK is sent over the air interface and is received by the first base station 105.

In action 204, the TCP1 ACK traverses the base station 105, which sends it towards the server 140. The TCP1 ACK is then received by the server 140.

In action 205, upon receiving the TCP1 ACK, the server 140 determines a RTT, RTT1, of the first TCP data packet TCP1. The RTT1 is calculated as the time that passed between the sending of the first TCP data packet TCP1 from the server 140 in action 201, to the receipt of the TCP1 ACK by the server 140 in action 204. The server 140 also calculates a SRTT taking the RTT1 into account. This may be done according to any of the previously described ways.

For the purpose of illustrating what RRT is, the time period corresponding to RTT1 has been indicated by a dashed arrow in the FIG. 2. It is however to be understood that the illustrations of round trip times and a handover outage time in the FIG. 2 are included solely for the sake of clarity, and that they are not drawn to a scale of any kind.

In action 206, the first base station 105 receives a measurement report from the user equipment 135. The measurement report is an indication that a handover is upcoming for the user equipment 135 from the first cell 110 to the second cell 120.

Therefore, in action 207, the first base station 105 starts handover preparations.

Since the upcoming handover will cause a handover outage which prolongs RTTs of TCP packets between the server 140 and the user equipment 135 during the handover execution, there is now a risk for TCP timeouts, as previously explained.

In action 208, a second TCP data packet, TCP2, is sent from the server 140 in the time period preceding the expected handover outage.

In action 209, the second TCP data packet TCP2 traverses the first base station 105 and reaches the user equipment 135

In action 210, the user equipment 135 sends an acknowledgement, TCP2 ACK towards the server 140. The TCP2 ACK is received by the first base station 105, and this time, the TCP 2 ACK is not directly sent towards the server 140 by the base station 105, as was the normal case with the TCP1 ACK as described above.

Instead, in action 211, the first base station 105 delays the TCP2 ACK, to increase its RTT, RTT2.

The delaying may be performed by buffering the TCP2 ACK. Note that this delaying is performed deliberately, and is not to be confused with another, small, delay which may always occur when the TCP packets traverses the first base station 105. The purpose of the deliberate delay is to prepare for the handover outage, by causing an increased RTT2, and hence an increased RTO. As previously mentioned, the TCP2 may be represented by a sequence of several individual TCP packets which in this action are individually delayed by different suitable delays to gradually increase the RTO. How the individual delays may be chosen will be discussed in more detail further down in this disclosure.

Embodiments herein can hence, thanks to the delaying performed in this action, prevent TCP timeouts by the first base station 105, or another suitable network node along the pathway 145 of the TCP packets, delaying TCP packets in a time period preceding the expected handover outage. This way, the RTT for TCP packets going between the server 140 and the user equipment 135 shortly before the handover will be prolonged by the deliberate delay. This reduces the risk of TCP timeout during the handover outage, because estimated RTT, or SRTT, as well as RTO based thereon will be adapted for longer RTTs before the handover outage occurs. Thanks to embodiments herein, the RTO will hence be set at a higher level before the handover outage occurs and allow for prolonged RTTs during the handover.

Note again that, when obtaining the indication of the handover being upcoming, the first base station 105 may delay several TCP packets on their way to and/or from the user equipment 135 to gradually increase the SRTT. The consequences of the delaying will be illustrated in the following actions below.

In action 212, the delayed TCP2 ACK is sent towards the server 140 from the first base station 105. The delayed TCP2 ACK is received by the server 140.

In action 213, the RTT of the delayed TCP2 ACK, RTT2, and the corresponding SRTT is calculated by the server 140.

Thanks to the delay performed in action 211, the RTT2 is longer than RTT1, and hence the corresponding SRTT is increased, which in turn will cause an increased RTO.

In action 214, handover execution starts in the involved nodes, i.e. in the first base station 105, the second base station 110, and the user equipment 135. The handover execution involves several not shown steps and actions. In this example, these actions are referred to simply as handover execution. During the time the handover execution lasts, there is a handover outage, as indicated by the dashed arrow in the FIG. 2.

In action 215, which occurs during the handover outage, a third TCP data packet, TCP3, is sent from the server 140 towards the user equipment 135. Depending on when the pathway 145 is changed in to instead go through the target second base station 115, this third TCP data packet TCP3 may be received by either the first base station 105 or the second base station 115. If the third TCP data packet TCP3 is received by the first base station 105, the first base station 105 forwards the third TCP data packet TCP3 to the second base station 115. Hence, in this action the third TCP data packet TCP3 is received by the second base station 115 either directly or via the first base station 105.

Due to the handover outage, the user equipment 135 cannot be reached by, as previously explained. Therefore, the third TCP data packet TCP3 cannot be sent to the user equipment 135 until the handover outage is over.

In action 216, the handover execution finishes and the handover outage is over.

Hence, in action 217, the second base station 105 may now transmit the third TCP data packet TCP3 to the user equipment 135, and the third TCP data packet TCP3 is received by the user equipment 135.

In action 218, an acknowledgement of the third TCP data packet TCP3, TCP3 ACK, is sent from the user equipment 135 to the second base station 115 which is now its serving base station via its new serving cell, i.e. the second cell 120.

In action 219, the TCP3 ACK is then sent towards the server 140 by the second base station 105.

The RTT related to third TCP data packet TCP3 is also illustrated by a dashed arrow in the FIG. 2. As can be seen, this RTT3 is rather long, because it was prolonged by the handover outage. Still, thanks to the delaying in action 211, the RTO in the server 140 was adapted to make allowance for the prolonged RTT3, and no TCP timeout had to occur in the server 140 due to the handover outage.

The above example served to illustrate how some embodiments herein improves TCP performance during a handover by delaying TCP packets arriving in a network node along the pathway 145 in a time period preceding the handover outage.

This helps avoiding TCP timeouts and hence increases TCP performance.

A further advantage of embodiments herein, is that by delaying the TCP packets and increasing the RTT, TCP packets may be sent at a slower rate from the server 140 during the handover. That is, in the above example, it is likely that third TCP data packet TCP3 represents fewer individual TCP packets. This decreases an amount of TCP packets that need to be forwarded from the first base station 105 to the second base station 115. This saves resources.

The above example may for example correspond to a case where the user equipment 135 is downloading a file from the server 140.

It was shown in the example that for downlink TCP data packets from the server 140 to the user equipment 135, the user equipment 135 will send TCP ACKs of the TCP data packets to the server 140 in uplink.

During the TCP session, the sender, i.e. the server 140 in this example, continuously measures and estimates RTT and RTO based on when the TCP ACKs arrive.

Upon reception of the TCP ACKs, the sender may send more TCP data packets based on the window size limitation in TCP.

Some embodiments herein suggest that the first base station 105 should start delaying the uplink TCP ACKs to the server 140 when a handover decision has been taken for the user equipment 135.

After the delaying, the server 140 will receive delayed TCP ACKs, and thus increase the RTT estimate of the TCP packets to come. The RTO will in turn also increase, and this will decrease the risk of a TCP timeout during handover outage time. Also, it has been discussed that by delaying the TCP ACKs, the server 140 may be blocked from sending more TCP packets, which in turn results in fewer TCP packets to be forwarded from the first, serving, base station 105 to the second, target, base station 110 during handover.

In some embodiments, the TCP data packets are uplink TCP data packets, from user equipment 135 to the server 140. Then it the user equipment 135 that computes RTT and decides TCP timeouts. When a handover preparation phase starts in this case, the first base station 105 may instead delay, or buffer, TCP ACK packets on their way to the user equipment 135. This will increase the user equipment 135 RTT estimate, and may avoid a potential TCP timeout in the user equipment 135.

In some embodiments, the first base station 105 has a DPI (Deep Packet Inspection) module. Based on the DPI module's analysis of TCP flows, the first base station may know if a TCP session contains downlink and/or uplink data.

If a session contains downlink data, then the DPI module may compute the RTT from the first base station 105 to the user equipment 135, by taking the difference of TCP packet arrive time at the first base station 105 and the ACK arrive time for the given TCP packet at the first base station 105.

If the TCP session contains uplink data, the DPI may also be able to compute the RTT from the first base station 105 to the server 140. This RTTs may be useful for choosing a suitable delay, since it may be used for example for estimating the RTO in the sender node.

For scalability reasons, the DPI module may start to monitor a certain TCP flow only when a measurement report from a user equipment 135 is received as in the action 206 above, or when a handover decision has been taken.

The handover execution time, or the outage time, may also be an important input parameter to determine the delay, or delays to be used. The first base station 105 may contain a handover module to monitor handover execution time to its neighboring base stations, such as the second base station 115, and store them into a database. Based on previous handover execution times to different neighboring base stations, the first base station 105 may then estimate the average, as well as lower and upper bounds for, handover execution times, and thus of expected handover outage duration.

When the first base station 105 decides to perform a handover from the source cell, i.e. the first cell 110 in this example, to the target cell, i.e. the second cell 120 in this example, by triggering events handover preparation, the first base station 105 may start to deliberately delay TCP packets. In general, it should delay packets to increase the RTT and sender's estimate of RTO so that TCP timeout will not occur. Also, the procedure may need to gradually increase the delay so that TCP timeout does not occur on these deliberately TCP packets.

A more detailed description of how the first base station 105 may deliberately delay, i.e. buffer, the packets will now follow.

Consider first the case of downlink TCP data, where the first base station 105 delays uplink TCP ACKs from user equipment 135 to the server 140. It will now be described which amount of time the first base station 105 may deliberately delay each TCP packet.

If the TCP timeout issue is not considered, while only trying to avoid packet forwarding during an upcoming handover, the first base station 105 may delay the TCP packets the same amount of time as handover outage time. In this way, not so much queuing is required in the first base station 105, and hopefully, the server 140 will send TCP packets directly to the target, i.e. to the second base station 115, if the system is able to re-configure the forwarding path 145 quickly. Therefore, the handover outage time may be chosen as an upper bound on the delay of the TCP packets.

A next question may be how to gradually increase the delay until it reaches the handover outage time. Let D(i) denote the extra delay we introduce to packet i.

i=0 will be used for the first TCP packet received after the an indication of a handover being upcoming as been obtained, e.g. after a handover decision has been taken. This would correspond to TCP2 in the example in FIG. 2. This TCP packet, may be delayed up to $D(0)=(\beta-1)*SRTT(0)$ without introducing a TCP timeout. SRTT(0) may be observed from a DPI module if the TCP session contains both uplink and downlink data. If the TCP session has only downlink data, only a part of the SRTT(0) from the user equipment 135 to the first base station 105 may be observed.

Note that if there is only downlink TCP data packets no new data will be acknowledged by the server 140, so the base station 105 may not be able to measure the time it takes for the TCP packets to travel from the first base station 105 to the server 140. However, this part may also be used as the SRTT(0), but then the delay may be increased in a slower rate.

After delaying the first TCP packet, the RTT S(1) of the delayed TCP packet may be computed by adding D(i) with average RTT before handover. Based on S(1), the SRTT(2) may also be computed based on the formula:

$SRTT(i+1)=(1-\alpha)*SRTT(i)+\alpha*S(i)$

The retransmission timeout RTO(2) may also be computed using:

$RTO(i)=\beta*SRTT(i)$

The first base station 105 may then delay further TCP packets following the first TCP packet, and so on, with a time based on the formula:

$D(i)=(\beta-1)*SRTT(i)$

Note that, in the FIG. 2, these further TCP packets would also be comprised in the TCP2 as individual TCP packets.

When delaying each TCP packet i, SRTT(i+1) and RTO (i+1) may be computed. The individual TCP packets may be delayed until D(i) reaches the handover outage time.

Figure 3A:
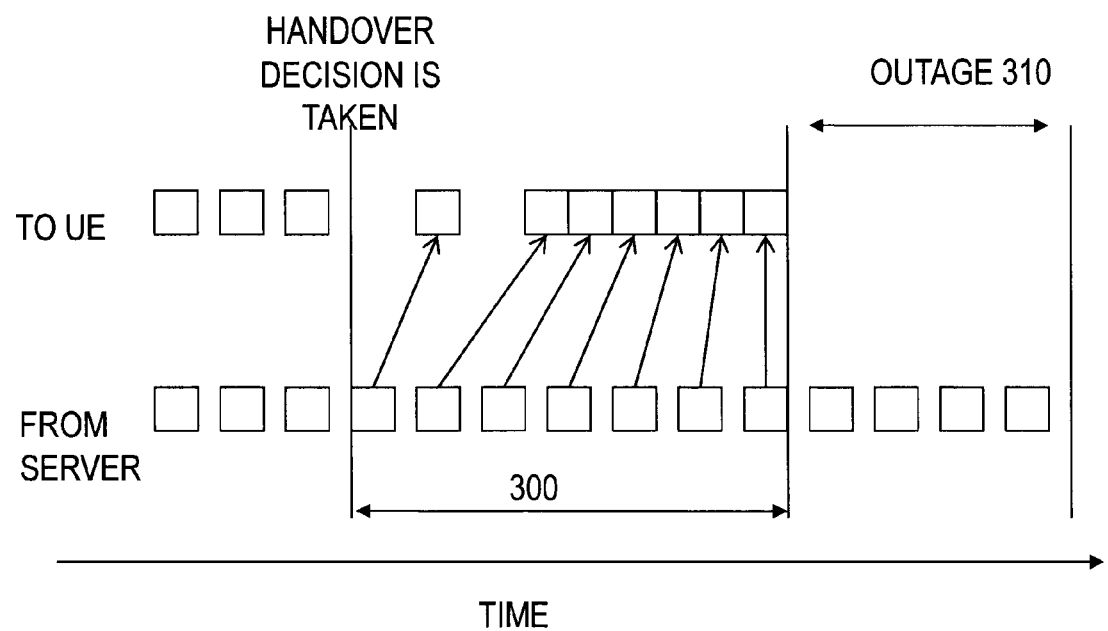
FIG. 3a is a schematic illustration of an embodiment of a flow of data packets.

FIG. 3a diagrams a flow of TCP packets passing through the first base station 105 and being delayed in the downlink. The FIG. 3a diagrams the flow of the TCP packets in the downlink as they go through the first base station 105. The horizontal axis is time and the square boxes are the individual TCP packets. Also indicated in the FIG. 3a, is a time period 300 preceding the handover outage. It is in this time period that the TCP packets are delayed. The time period 300 may be the handover preparation time. Also, a duration time 310 of the handover outage is illustrated.

The server 140 sends the TCP packets to the first base station 105 in a steady stream. The TCP packets leaving the first base station 105, going to the user equipment 135, are delayed to increase the estimate of RTT. Note that to increase the RTT estimate as much as possible, most delayed TCP packets should be sent just before the handover outage occurs. As can be seen in this figure, the delay of the individual TCP packets may first be increased in the beginning of the sequence of TCP packets, and then be decreased towards the end of the sequence. This is to gradually increase the RTT of the individual TCP packets in the beginning of the sequence to gradually adapt the RTO, while increasing the RTT sufficiently by decreasing the delay of the individual TCP packets towards the end of the sequence. In the FIG. 3a, arrows are drawn to indicate which incoming TCP packet corresponds to which outgoing TCP packet, and the inclination of the individual arrows hence illustrate how much each individual TCP packet is deliberately delayed by the first base station 105.

Figure 3B:
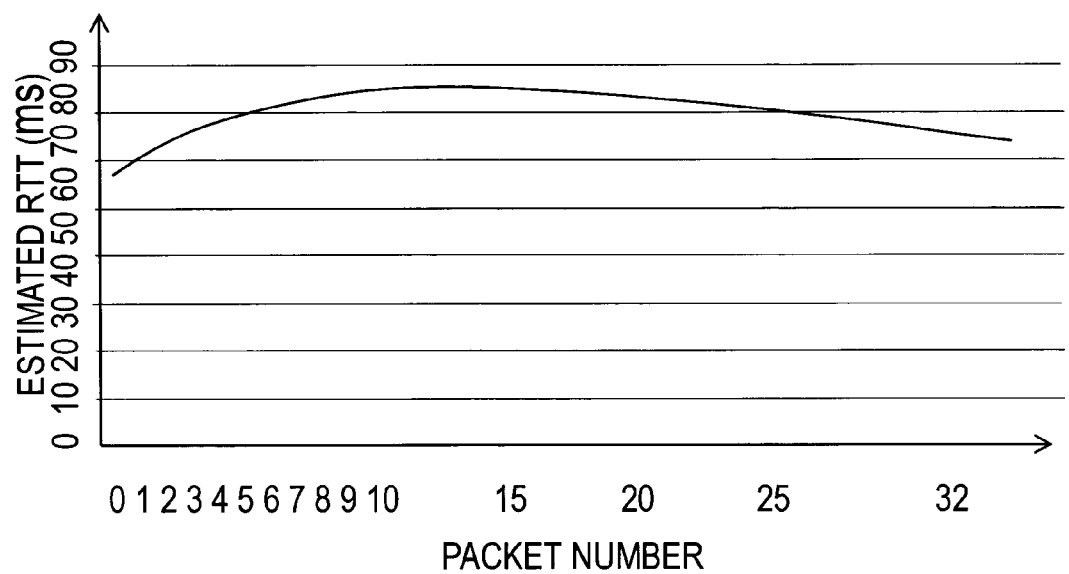
FIG. 3b is a graph illustrating estimated RTT values versus packet number.

FIG. 3b illustrates, schematically and by way of example, the estimated RTT at the user equipment 135 sender node when downlink TCP packets including ACKs are delayed according to a scheme as that described in relation to FIG. 3a. Note that the delay of downlink TCP packets result in an increase of estimated RTT for uplink data transfer.

Hence, when a handover preparation phase starts, the first base station 105 may delay downlink TCP ACKs from the server 140 to the user equipment 135. The first base station

105 may then increase the delay of the individual TCP packets gradually as has previously been described, so that no TCP timeout will occur for the delayed TCP packets. In addition, all the TCP ACKs may be sent out to the user equipment 135 before the user equipment 135 gets detached from the first base station 105, i.e., before the start of the handover outage. The start of the handover outage may be a RRC connection reconfiguration.

Figure 4A:
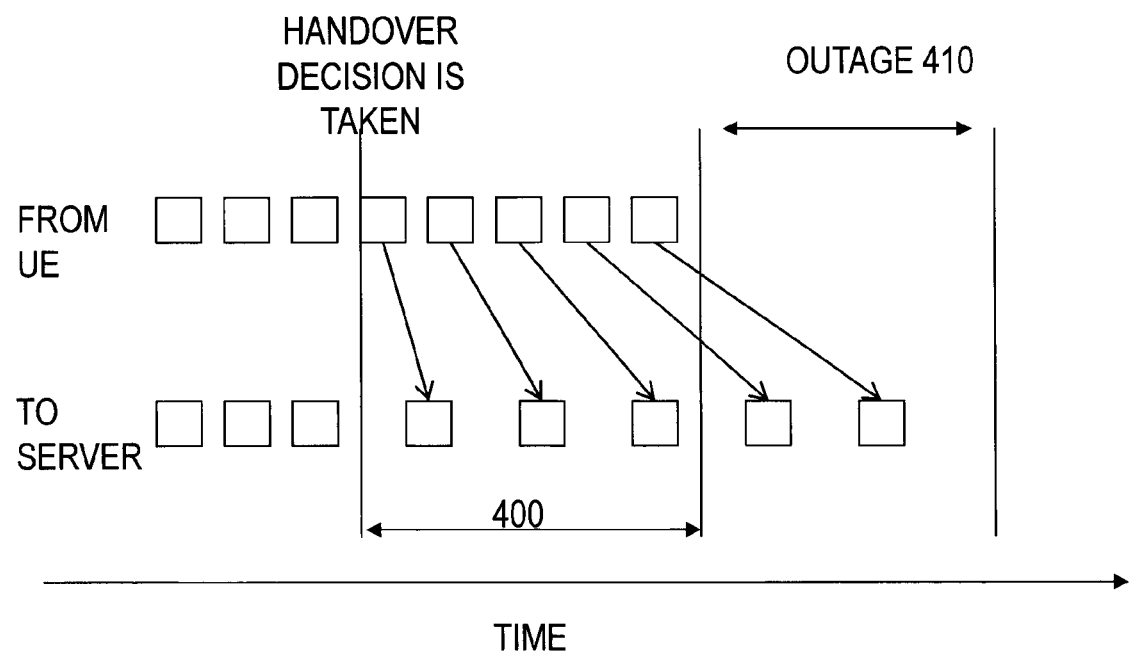
FIG. 4a is a schematic illustration of an embodiment of a flow of data packets.

FIG. 4a illustrates a flow of TCP packets passing through the first base station 105 and being delayed in the uplink instead according to some embodiments herein. The TCP packets depicted as in the FIG. 4a are hence uplink TCP packets. Also indicated in the FIG. 4a, is a time period 400 preceding the handover outage. It is in this time period that the TCP packets are delayed. The time period 400 may be the handover preparation time. Also, a duration time 410 of the handover outage is illustrated. The horizontal axis is time and the square boxes are the individual uplink TCP packets.

The user equipment 135 sends the TCP packets to the first base station 105 in a steady stream. TCP packets leaving the first base station 105, going to the server 140, are delayed after the handover decision has been taken to increase the estimate of RTT. As can be seen in this figure, the delay of the individual TCP packets may increase in the beginning of the sequence to gradually increase the RTT estimate and the RTO. Note also that some delayed TCP packets towards the end of the sequence need not leave the first base station 105 before the handover outage occurs. In the FIG. 4a too, arrows are drawn to indicate which incoming TCP packet corresponds to which outgoing TCP packet, and the inclination of the individual arrows hence illustrate how much each individual TCP packet is deliberately delayed by the first base station 105.

Figure 4B:
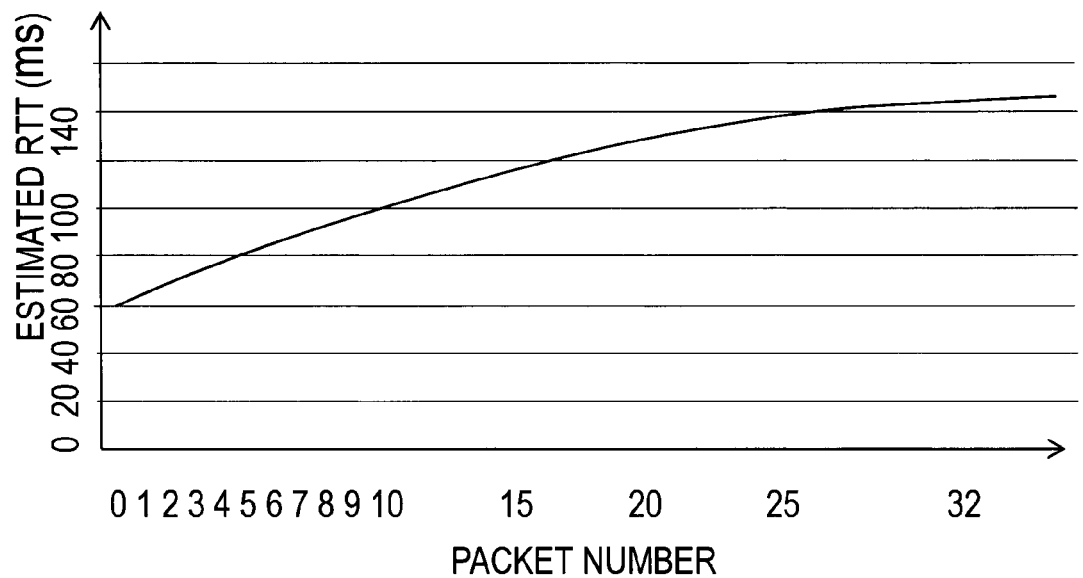
FIG. 4b is a graph illustrating estimated RTT values versus packet number.

FIG. 4b illustrates, schematically and by way of example, the estimated RTT at the server 140 for downlink data transfer when the uplink TCP packets including ACKs are delayed according to a scheme as that described in relation to FIG. 4a.

For the first base station 105 to deliberately delay the TCP packets, it may be useful to know TCP specific parameters at the user equipment 135 and/or at the server 140, for example RTOmin.

In current Linux implementation, the default value for RTOmin is 200 ms. The same value is also used in Android phones, as they are based on Linux. In addition, other type of phones such as IPhone or others using Windows mobile as OS probably has its own default setting for RTOmin. By reading the IMEI (International Mobile Equipment Identity) from the user equipment 135, it may be possible to know the type of the user equipment 135, and then determine its default RTOmin.

The duration of the time between the time instant that the first base station 105 obtains an indication that a handover is upcoming, to the time instant that the first base station 105 loses connection to the user equipment 135, i.e. the start of the handover outage, may be referred to as the handover preparation time. This may be the time used for delaying downlink TCP packets. In the uplink, the delaying may continue after the start of the handover outage since the TCP packets may still be sent from the first base station 105 to the server 140 during the handover outage as illustrated in FIG. 4a.

The indication of a handover being upcoming may be for example a measurement report as in the example in FIG. 2, or a handover decision.

The handover preparation time may be from a handover decision to a RRC connection reconfiguration.

From the Perfmon database for Telia LTE networks, it has been found that a minimum handover preparation time may be 19 ms, and an average handover preparation time may be 32 ms, based on more than 1 million samples of data.

Assuming a throughput of 10 Mbit/S and a maximum packet size of 1500 bytes, this corresponds to 0.8 TCP packets/ms. This means that in a 32 ms interval, there may be about 26 individual TCP packets to delay.

The estimated RTT is based on the formula $SRTT(i+1)=(1-\alpha)*SRTT(i)+\alpha*S(i)$, with default a value for a set to 0.125. With 26 packets, $1-(1-0.125)26=97\%$ of the SRTT is based on these delayed packets. This means that the RTT of delayed TCP packets will have a large impact of the SRTT and RTO at the sender.

A further question is how much time the first base station 105 may buffer each individual TCP packet. When delaying TCP ACKs from the server 140 to the user equipment 135, the maximum buffering time may be the handover preparation time, as when the user equipment 135 loses the connection to the first base station 105, no TCP packets may be sent to the user equipment 135. However, on the uplink direction, even after the user equipment 135 has lost connection to the first base station 105, the TCP ACKs may still be delayed towards the server 140. So in the uplink TCP packet case the first base station 105 may delay TCP packets up to the handover outage time to significantly increase estimated RTT and RTO.

FIG. 5 shows details in a table of an example of TCP packet delays in the downlink. In this example, the TCP packets are TCP ACKs from the server 140 to the user equipment 135.

In the table, the following is shown: TCP packet number, incoming time, i.e. the time instant at which the TCP packet arrives at the first base station 105, outgoing time, i.e. the time instant that the delayed TCP packet is sent from the first base station 105 to the user equipment 135. Observe that the outgoing time for different TCP packets may differ slightly but all are sent shortly before the handover outage. As a second scale is used in this column, all packets are sent out at time 32.

In this example the following has been assumed: the handover preparation time is 32 ms, the handover outage time is 90 ms, RTT of packets is 60 ms before the handover, and one TCP packet arrives every millisecond, which corresponds to 12 Mbit/s. With this setup, the first TCP packet experiencing handover will have an RTT of around 150 ms. In this case there is a need to increase the RTO to 150 ms to avoid TCP timeout.

In the FIG. 3b relating to delaying of downlink TCP packets, and in the table in FIG. 5, it is shown that the estimated RTT, and the corresponding SRTT and RTO, initially increase, and that in the illustrated example the RTO may be increased to above 150 ms. However, RTT and hence RTO starts to decrease after some TCP packets when less time may be used for delaying TCP packets arriving shortly before the handover outage, e.g. shortly before RRC connection reconfiguration.

FIG. 6 shows details in a table of an example of TCP packet delays in the uplink. In this example, the TCP packets are TCP ACKs from the user equipment 135 to the server 140.

In the table, the following is shown: TCP packet number, incoming time, i.e. the time instant at which the TCP packet arrives at the first base station 105, outgoing time, i.e. the time instant that the delayed TCP packet is sent from the first base station 105 to the server 140.

In this example too the following has been assumed: the handover preparation time is 32 ms, the handover outage time is 90 ms, RTT of packets is 60 ms before the handover, and one TCP packet arrives every millisecond, which corresponds to 12 Mbit/s. With this setup, the first TCP packet experiencing handover will have an RTT of around 150 ms. In this case there is a need to increase the RTO to 150 ms to avoid TCP timeout.

In this table it is shown that for the uplink TCP ACKs, the RTO may be increased to a much higher value than 150 ms. Observe also that in this table, there is a safety factor of 0.7. For example, for packet nr 1 in the table, outgoing time could be 60 ms as this packet may be delayed at most 60 ms without causing a TCP timeout. However, it is shown that in this example the delay is only 0.7*60=42 ms.

To conclude, in a downlink data transfer, uplink TCP ACKs from the user equipment 135 to the server 140 may be delayed in a very efficient way, and thanks to this, TCP timeouts may with a high probability timeouts be avoided.

In uplink data transfer, with downlink TCP ACKs from the server 140 to the user equipment 135 being delayed, the maximum TCP packet delay may be limited to the handover preparation time of roughly 32 ms, so it may in some cases be uncertain if all TCP timeouts may be avoided. Therefore, two additional ways to improve the algorithm further in the case of delaying downlink TCP ACKs according to some embodiments herein will shortly be describe in the following.

The first approach is to stop sending TCP ACKs to the user equipment 135 when the RTO is above 150 ms and is decreasing, and instead forward the remaining TCP packets to the second base station 115. For example, for the TCP packet details in the table in FIG. 5, after sending the first 16 packets, the last 16 packets may be sent to the second base station 110. The user equipment 135, which is the sender in this example, will then have an RTO of 158.6 ms.

The second approach is to use the TCP timestamp option. The timestamp option is now used by default in Linux implementations. The basic idea is that the TCP data sender puts the TCP data packet sending time on the TCP data packet. The TCP data packet receiver then copies this time into the TCP ACK for this TCP data packet, and the sender may then use this sending time of the TCP data packet and the receipt time of the TCP ACK to compute RTT of the TCP packet. However, if the sending time of the TCP ACK is altered in the first base station 105, the computed RTT may be increased, thus avoiding a timeout. However, since this approach alters the TCP packet itself, it may some unwanted side effects.

Embodiments herein provide advantages in both uplink and downlink TCP data transfer.

In downlink TCP data transfer, embodiments herein reduce the number of TCP timeouts during handover which in turn improves the TCP performance. These improvements would be perceived in scenarios where a user of the user equipment 135 experiences a high number of handovers, e.g., in the case of the user equipment 135 being fast moving or located or in a high density cellular network 100, which is the case of the networks deployed in highly populated areas. In addition, embodiments herein may reduce the amount of TCP packet forwarding between the first base station 105 and the second base station 115.

In uplink TCP data transfer, by delaying TCP ACKs to the user equipment 135, the number of TCP timeouts may also be reduced.

Figure 7:
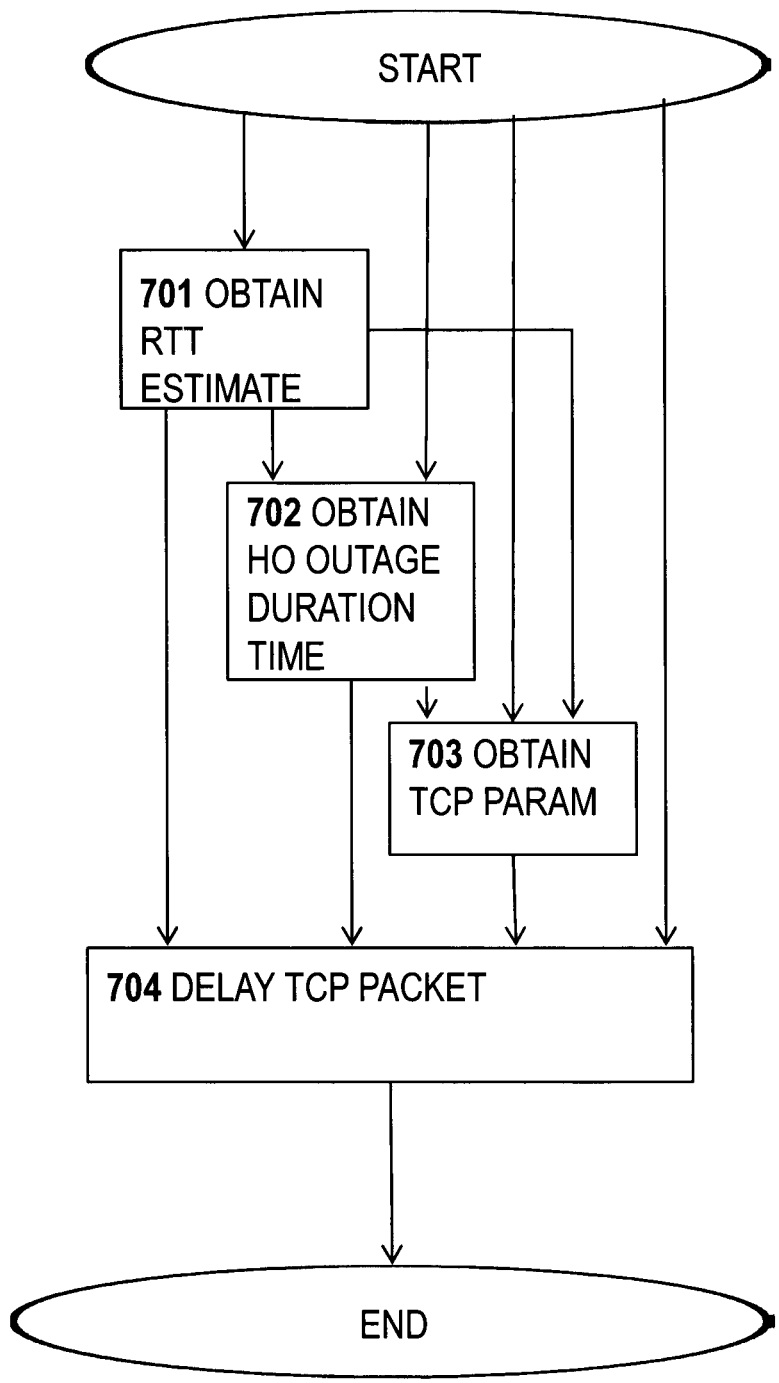
FIG. 7 is a flowchart depicting embodiments of a method in a network node.

Embodiments herein relating to a method in a network node for improving transmission control protocol, TCP, performance in the cellular network 100, will now be further elaborated and described with reference to the flowchart depicted in FIG. 7. These embodiments will be described in a more general way. The network node handles TCP packet transferral between the user equipment 135 in the cellular network 100 and the server 140. The user equipment 135 and the server 140 are as previously mentioned configured to adapt a retransmission timeout, RTO, setting based on round trip times, RTTs, for performed TCP packet transferrals. The cellular network 100 and the user equipment 135 may be of any of the previously described types. The network node may be the first base station 105, the serving gateway 125 or the PDN gateway 130, which too may be of any of the previously described types. In some embodiments the network node may be the core network router within control of an operator of the cellular network 100, or another suitable network node along the pathway of the TCP packet.

Note that by "round trip time" is understood the time it takes for a TCP packet comprising data, i.e. a TCP data packet, to go from its sender to its destination, plus the time it takes for a TCP packet comprising an acknowledgement of receipt of the data to go from the destination to the sender. By "TCP packet" is hence understood either the TCP packet comprising the data or the TCP packet comprising the acknowledgement of the data.

By "handling TCP packet transferral" is understood forming part of a TCP packets pathway between the server 140 and the user equipment 135.

The upcoming handover may be an inter-frequency handover or an intra-frequency handover, it may also be an inter-system handover or an intra-system handover.

Note also that in some embodiments the server 140 may be another entity such as another user equipment.

The method comprises the action 704 which will be described below. The method may further comprise one or more of the optional actions 701-703 which will be described first.

In optional action 701, the network node 105, 125, 130, obtains an estimate of an expected round trip time for the TCP packet. The estimated of the expected round trip time may be obtained in any of the previously described ways.

According to some embodiments, the expected round trip time is based on a deep packet inspection of a previously transferred TCP packet.

In optional action 702, the network node 105, 125, 130, obtains an estimate of an expected duration time of the handover outage.

In optional action 703, the network node 105, 125, 130, obtains a TCP parameter, which TCP parameter is specific to the user equipment 135 and/or to the server 140.

The TCP parameter may be for example the minimum RTO for the user equipment 135 and/or the server 140 in question.

In action 704 the network node, 105, 123, 130, deliberately delays a transferral of the TCP packet between the server 140 and the user equipment 135 to increase the round trip time for the TCP packet. The TCP packet is delayed when the network node obtains an indication of a handover outage 310, 410 being upcoming for the user equipment 135. The delaying is performed in a time period (300, 400) preceding the indicated handover outage 310, 410.

Thanks to the deliberate delay, the RTO in the sender, i.e. the user equipment 135 or the server 140 is increased. This makes allowance for the handover outage time due to which RTT is prolonged for TCP packets sent during the handover. Such prolonged RTTs would otherwise likely have caused unnecessary TCP timeouts in the sender. Thanks to embodiments herein, such TCP timeouts are avoided.

According to some embodiments, when the optional action 701 has been performed, the delaying in action 704 may be performed based on the expected round trip time.

According to some embodiments, when the optional action 702 has been performed, the delaying in action 704 may be performed based on the estimate of the expected duration time of the handover outage.

According to some embodiments, when the optional action 703 has been performed, the delaying in action 704 may be performed based on the TCP parameter.

According to some embodiments, the TCP packet is represented by a sequence of individual TCP packets. The delaying performed in action 704 may then comprise delaying the individual TCP packets in the sequence. This may be done in any of the previously described ways, and an advantage with this is that a gradual adaption and satisfactory increase of the RTO adaptation is possible.

According to some embodiments, the TCP packets in the sequence are downlink TCP packets, the delaying of the individual TCP packets decreases towards the end of the sequence.

According to some embodiments, the delaying of the individual TCP packets then first increases in the beginning of the sequence, and then decreases towards the end of the sequence.

Since, for the uplink, the delayed TCP packets need be sent before the indicated handover outage occurs, gradually decreasing the delay between the individual TCP packets to send as many TCP packets as possible soon before the handover timeout occurs enables a larger increase of the RTO setting.

According to some embodiments, the TCP packets in the sequence are uplink TCP packets, and the delaying of the individual TCP packets increases in the beginning of the sequence.

According to some embodiments, the delaying of the individual TCP packets then first increases in the beginning of the sequence, and then becomes steady towards the end of the sequence.

According to some embodiments, the indication is obtained from an entity in control of the upcoming handover such as for example the first base station 105 or an MME. The indication may be for example a measurement report or a handover decision.

Figure 8:
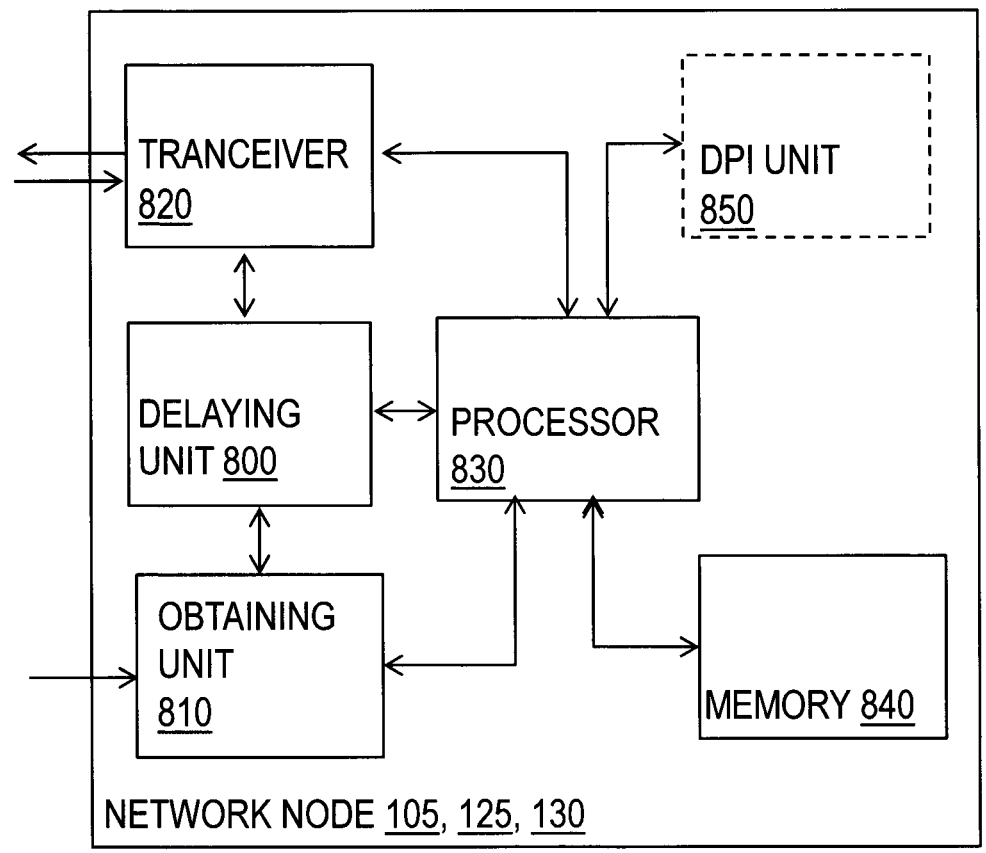
FIG. 8 is a schematic block diagram illustrating embodiments of a network node.

To perform the actions above for improving transmission control protocol, TCP, performance in a cellular network 100, the network node 105, 125, 130 comprises an arrangement schematically depicted in FIG. 8. The network node 105, 125, 130 is adapted to handle TCP packet transferral between the user equipment 135 in the cellular network 100 and the server 140. As mentioned above, the user equipment 135 and the server 140 are configured to adapt a retransmission timeout, RTO, setting based on round trip times for performed TCP packet transferals. As also previously mentioned, the network node 105, 125, 130 may be the first base station 105, the serving gateway 125 or the PDN gateway 130, which too may be of any of the previously described types.

The term "configured to" used herein may also be referred to as "arranged to".

The term "unit" may comprise software implementations and/or hardware circuitry.

The network node comprises a delaying unit 800. The delaying unit 800 is configured to, when obtaining an indication of a handover outage 310, 410 being upcoming for the user equipment 135, deliberately delay, in a time period 300, 400 preceding the indicated handover outage 310, 410, a transferal of a TCP packet between the server 140 and the user equipment 135 to increase the round trip time for the TCP packet.

In some embodiments, the TCP packet may be represented by a sequence of TCP packets, and the delaying unit 800 may then further be configured to delay the individual TCP packets in the sequence.

In some embodiments, the TCP packets in the sequence may be downlink TCP packets, and the delaying unit 800 may further be configured to decrease the delay of the individual TCP packets towards the end of the sequence.

In some embodiments the delaying unit 800 may further be configured to first increase the delay of the individual TCP packets in the beginning of the sequence, and then decrease the delay of the individual TCP packets towards the end of the sequence.

In some embodiments the TCP packets in the sequence are uplink TCP packets, and the delaying unit 800 may further be configured to increase the delay of the individual TCP packets in the beginning of the sequence.

In some embodiments the delaying unit 800 is further configured to first increase the delay of the individual TCP packets in the beginning of the sequence, and then let the delay become steady towards the end of the sequence.

In some embodiments the delaying unit 800 is further configured to obtain the indication from an entity in control of the upcoming handover.

In some embodiments the network node 105, 125, 130 further comprises an obtaining unit 810. The obtaining unit 810 may be configured to obtain an estimate of an expected round trip time for the TCP packet. The delaying unit 800 may then further be configured to delay the TCP packet based on the expected round trip time.

In some embodiments the expected round trip time is based on a deep packet inspection of a previously transferred TCP packet.

In some embodiments the obtaining unit 810 may be configured to obtain an estimate of an expected duration time of the handover outage, then the delaying unit 800 may further be configured to delay the TCP packet based on the expected duration time of the handover outage.

In some embodiments the obtaining unit 810 may be configured to obtain a TCP parameter, which TCP parameter is specific to the user equipment 135 and/or the server 140. Then, the delaying unit 800 may further be configured to delay the TCP packet based on the TCP parameter. It is to be understood that the obtaining unit 810 referred to above may in some embodiments be several different obtaining units.

Note that to perform the actions above, the network node comprises a transceiver 820 which is configured to receive and transmit TCP packets.

The embodiments of the network node 105, 125, 130 for improving transmission control protocol, TCP, performance in the cellular network 100, may be implemented through one or more processors, such as a processor 830 in the depicted network node 105, 125, 130 in FIG. 9, together with computer program code for performing the actions of embodiments herein.

The program code mentioned above may also be provided as a computer program product, for instance in the form of a data carrier carrying computer program code for performing the embodiments herein when being loaded into the network node 105, 125, 130.

One such carrier may be in the form of a CD ROM disc. It is however feasible with other data carriers such as a memory stick. The computer program code may furthermore be provided as pure program code on a server and downloaded to network node 105, 125, 130 e.g. remotely.

The network node 105, 125, 130 may further comprise a memory 840 comprising one or more memory units. The memory 840 may be arranged to be used to store data or for buffering one or more TCP packets to delay them. It may further be arranged to store applications to perform the actions of the embodiments herein when being executed in network node 105, 125, 130.

Some embodiments of the network node 105, 125, 130 for improving transmission control protocol, TCP, performance in the cellular network 100, may further comprise a deep packet inspection unit 850 as previously described.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a network node for improving transmission control protocol, TCP, performance in a cellular network, which network node handles TCP packet transferral between a user equipment and a server in the cellular network, which user equipment and which server are configured to adapt a retransmission timeout, RTO, setting based on round trip times, RTTs, for performed TCP packet transferrals, the method comprising:
   when obtaining an indication of a handover outage being upcoming for the user equipment, deliberately delaying, in a time period preceding the indicated handover outage, a transferal of a TCP packet between the server and the user equipment to increase the round trip time for the TCP packet;
   obtaining an estimate of an expected duration time of the handover outage, wherein the expected duration time of the handover outage is estimated based on previous handover execution times to different neighboring base stations, and wherein the delaying is performed based on the expected duration time of the handover outage; and
   obtaining a TCP parameter specific to the user equipment and/or to the server, wherein the delaying is performed based on the TCP parameter.

2. The method according to claim 1, wherein the TCP packet is represented by a sequence of individual TCP packets, and wherein the delaying comprises delaying the individual TCP packets in the sequence.

3. The method according to claim 2, wherein the TCP packets in the sequence are downlink TCP packets, and wherein the delaying of the individual TCP packets decreases towards the end of the sequence.

4. The method according to claim 3, wherein the delaying of the individual TCP packets first increases in the beginning of the sequence, and then decreases towards the end of the sequence.

5. The method according to claim 2, wherein the TCP packets in the sequence are uplink TCP packets, and wherein the delaying of the individual TCP packets increases in the beginning of the sequence.

6. The method according to claim 5, wherein the delaying of the individual TCP packets first increases in the beginning of the sequence, and then becomes steady towards the end of the sequence.

7. The method according to claim 1, wherein the indication is obtained from an entity in control of the upcoming handover.

8. The method according to claim 1, further comprising obtaining an estimate of an expected round trip time for the TCP packet, and wherein the delaying is performed based on the expected round trip time.

9. The method according to claim 8, wherein the expected round trip time is based on a deep packet inspection of a previously transferred TCP packet.

10. A network node for improving transmission control protocol, TCP, performance in a cellular network, which network node is adapted to handle TCP packet transferral between a user equipment and a server in the cellular network, which user equipment and which server are configured to adapt a retransmission timeout setting based on round trip times for performed TCP packet transferrals, the network node comprising:
    a delaying unit, and an obtaining unit,
    which delaying unit is configured to, when obtaining an indication of a handover outage being upcoming for the user equipment, deliberately delay, in a time period preceding the indicated handover outage, a transferal of a TCP packet between the server and the user equipment to increase the round trip time for the TCP packet,
    which obtaining unit is configured to obtain an estimate of an expected duration time of the handover outage, wherein the expected duration time of the handover outage is estimated based on previous handover execution times to different neighboring base stations, and wherein the delaying unit is further configured to delay the TCP packet based on the expected duration time of the handover outage, and
    which obtaining unit is further configured to obtain a TCP parameter specific to the user equipment and/or to the server and wherein the delaying unit is further configured to delay the TCP packet based on the TCP parameter.

11. The network node according to claim 10, wherein the TCP packet is represented by a sequence of TCP packets, and wherein the delaying unit is further configured to delay the individual TCP packets in the sequence.

12. The network node according to claim 11, wherein the TCP packets in the sequence are downlink TCP packets, and wherein the delaying unit is further configured to decrease the delay of the individual TCP packets towards the end of the sequence.

13. The network node according to claim 12, wherein the delaying unit is further configured to first increase the delay of the individual TCP packets in the beginning of the sequence, and then decrease the delay of the individual TCP packets towards the end of the sequence.

14. The network node according to claim 11, wherein the TCP packets in the sequence are uplink TCP packets, and wherein the delaying unit is further configured to increase the delay of the individual TCP packets in the beginning of the sequence.

15. The network node according to claim 14, wherein the delaying unit is further configured to first increase the delay of the individual TCP packets in the beginning of the sequence, and then let the delay become steady towards the end of the sequence.

16. The network node according to claim 10, wherein the delaying unit is further configured to obtain the indication from an entity in control of the upcoming handover.

17. The network node according to claim 10, further comprising the obtaining unit configured to obtain an estimate of an expected round trip time for the TCP packet, and wherein the delaying unit is further configured to delay the TCP packet based on the expected round trip time.

18. The network node according to claim 10, wherein the expected round trip time is based on a deep packet inspection of a previously transferred TCP packet.

* * * * *